United States Patent
Oskam et al.

(10) Patent No.: US 8,885,021 B2
(45) Date of Patent: Nov. 11, 2014

(54) OPTIMIZED STEREOSCOPIC CAMERA FOR REAL-TIME APPLICATIONS

(75) Inventors: Thomas Oskam, Schaffhausen (CH); Alexander Hornung, Zurich (CH); Huw Bowles, Brighton (GB); Kenny Mitchell, Addlestone (GB); Markus Gross, Zürich (CH)

(73) Assignee: Disney Enterprises, Inc., Burbank, CA (US)

( * ) Notice: Subject to any disclaimer, the term of this patent is extended or adjusted under 35 U.S.C. 154(b) by 383 days.

(21) Appl. No.: 13/347,537

(22) Filed: Jan. 10, 2012

(65) Prior Publication Data
US 2013/0176397 A1 Jul. 11, 2013

(51) Int. Cl.
*H04N 13/00* (2006.01)

(52) U.S. Cl.
CPC ....... *H04N 13/0011* (2013.01); *H04N 13/0022* (2013.01)
USPC .......................................................... 348/46

(58) Field of Classification Search
CPC ..... H04N 5/00; H04N 13/00; H04N 13/0022; H04N 13/0239; H04N 13/0203; A61B 1/00193; G02B 27/2207
See application file for complete search history.

(56) References Cited

U.S. PATENT DOCUMENTS

| | | | |
|---|---|---|---|
| 6,798,406 B1 * | 9/2004 | Jones et al. | 345/419 |
| 2012/0002723 A1 * | 1/2012 | Arakawa et al. | 375/240.03 |
| 2012/0146993 A1 * | 6/2012 | Ebisawa et al. | 345/419 |

OTHER PUBLICATIONS

Jones et al., *Controlling Perceived Depth in Stereoscopic Images*, Sharp Laboratories of Europe Ltd. (Jun. 2001).
Oskam et al., *Visibility Transition Planning for Dynamic Camera Control*, Eurographics / ACM SIGGRAPH Symposium on Computer Animation (Aug. 2009).
Zilly et al., *Production Rules for Stereo Acquisition*, Proceedings of the IEEE, vol. 99, No. 4, pp. 590-606, (Apr. 2011).

* cited by examiner

*Primary Examiner* — Huy T Nguyen
(74) *Attorney, Agent, or Firm* — Farjami & Farjami LLP

(57) ABSTRACT

A method is provided for an optimized stereoscopic camera with low processing overhead, especially suitable for real-time applications. By constructing a viewer-centric and scene-centric model, the mapping of scene depth to perceived depth may be defined as an optimization problem, for which a solution is analytically derived based on constraints to stereoscopic camera parameters including interaxial separation and convergence distance. The camera parameters may thus be constrained prior to rendering to maintain a desired perceived depth volume around a stereoscopic display, for example to ensure user comfort or provide artistic effects. To compensate for sudden scene depth changes due to unpredictable camera or object movements, as may occur with real-time applications such as video games, the constraints may also be temporally interpolated to maintain a linearly corrected and approximately constant perceived depth range over time.

20 Claims, 5 Drawing Sheets

US 8,885,021 B2

OPTIMIZED STEREOSCOPIC CAMERA FOR REAL-TIME APPLICATIONS

BACKGROUND

Stereoscopic video content can significantly enhance a viewing experience, providing greater impact, immersion, and realism compared to traditional two-dimensional video content. However, unless the stereoscopic content is carefully tailored and edited to prevent excessive stereoscopic disparities, viewer fatigue may result. Thus, the advantages of stereoscopic video content may be difficult to convey unless viewer comfort is first adequately addressed. Real-time stereoscopic applications such as three-dimensional video games also present special problems that need to be overcome for viewer comfort.

SUMMARY

The present disclosure is directed to an optimized stereoscopic camera for real-time applications, substantially as shown in and/or described in connection with at least one of the figures, as set forth more completely in the claims.

DETAILED DESCRIPTION

Figure 1A:
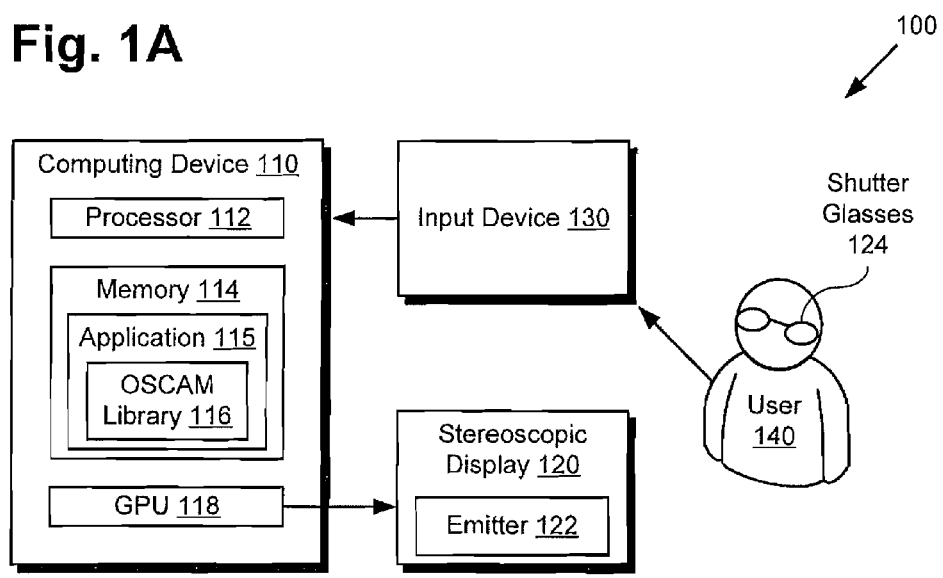
FIG. 1A presents an exemplary diagram of a system utilizing an optimized stereoscopic camera for real-time applications.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1A presents an exemplary diagram of a system utilizing an optimized stereoscopic camera for real-time applications. The term "real-time" used in this disclosure may be approximately or substantially real time but not exactly real time for one or more reasons, such as small time delays caused by electrical signals passed through components or data processed by a computer system. Diagram 100 of FIG. 1A includes computing device 110, stereoscopic display 120, shutter glasses 124, input device 130, and user 140. Computing device 110 includes processor 112, memory 114, and graphics processing unit (GPU) 118. Memory 114 includes application 115. Application 115 includes optimized stereoscopic camera (OSCAM) library 116. Stereoscopic display 120 includes emitter 122.

FIG. 1A may illustrate a typical setup for an interactive application providing stereoscopic video content, with the exception of OSCAM library 116 as further described below. Computing device 110 may include a personal computer, laptop, tablet computer, video game console, portable game system, mobile phone, or another device. Computing device 110 may include application 115 stored in memory 114, which may be any interactive stereoscopic application such as a video game having a first person perspective controlled by user 140. Portions of application 115 may be executed on processor 112, while other portions may be executed on GPU 118. User 140 may utilize input device 130 to interact with application 115. Input device 130 may include a game controller, a touch screen, a motion sensor, a mouse and keyboard, or any other input device. GPU 118 may output stereoscopic video generated by application 115 to stereoscopic display 120. Emitter 122 may synchronize with shutter glasses 124 to provide actively blocked left and right images to the left and right eyes of user 140, as known in the art. Other stereoscopic display methods may also be utilized such as parallax barriers, head mounted displays, and polarized glasses. Accordingly, emitter 122 and shutter glasses 124 may be omitted in certain implementations of stereoscopic display 120.

Existing solutions for adjusting stereoscopic video content for comfortable viewing are generally focused on the post-production of films or other recorded content, and are therefore not suitable for real-time applications where content must be adjusted within a limited time budget. Additionally, real-time applications such as video games present an additional challenge in the form of unpredictable scene depth transitions, as camera motion and object interactions may be user controlled. Without compensation, these sudden scene depth transitions cause fluctuations in perceived depth ranges, resulting in additional eyestrain for the user. Furthermore, existing solutions often require basic camera parameters to be adjusted, resulting in an inextricable mixing of two-dimensional and three-dimensional production workflows.

Accordingly, as discussed in the publication titled "OSCAM—Optimized Stereoscopic Camera Control for Interactive 3D" (Oskam, et al., December 2011 SA '11: Proceedings of the 2011 SIGGRAPH Asia Conference, Article No. 189; ISBN: 978-1-4503-0807-6), which is hereby incorporated fully into the present application by reference, geometric models may be constructed to derive constraints for interaxial separation and convergence of parallel dual cameras with image shift, whereby the constraints ensure a constant perceived depth range. This perceived depth range may be adjusted to a comfortable range by a viewer, set to a default range based on user comfort studies, or adjusted to specific ranges to accomplish artistic effects. These constraints may be enforced by OSCAM library 116, shown embedded within application 115 in FIG. 1A. Additionally, OSCAM library 116 may dynamically interpolate the constrained variables using a controlled transformation. Thus, for example, a linearized transformation may be utilized to smoothly compensate for scene depth changes over time, thereby providing an approximately constant perceived depth range. However, any arbitrary transform, including splines and discontinuous functions, may be supported for artistic depth transition effects. A high performance implementation may be provided for execution on GPU 118 for real-time application support.

Figure 1B:
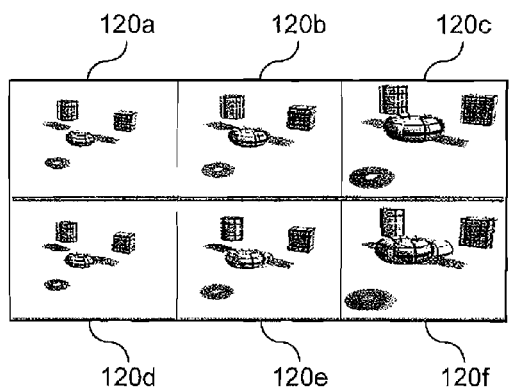
FIG. 1B presents exemplary displays of systems with and without an optimized stereoscopic camera for real-time applications.

FIG. 1B presents exemplary displays of systems with and without an optimized stereoscopic camera for real-time applications. Displays 120a, 120b, 120c, 120d, 120e, and 120f may each correspond to display 120 of FIG. 1A, each display showing an assortment of objects in a virtual scene. A virtual camera appears to approach closer to the objects from display 120a towards display 120c and from display 120d towards display 120f. Displays 120a, 120b, and 120c demonstrate results with the use of OSCAM library 116, whereas displays 120d, 120e, and 120f demonstrate results without the use of OSCAM library 116.

At first, the user may adjust the stereoscopic rendering parameters to ensure initially comfortable perceived depth ranges. Thus, both display 120a and 120d may begin within a comfortable perceived depth range. However, as the virtual camera approaches closer to the objects, it can be observed that display 120f, which uses conventional naïve unbounded stereoscopic rendering, contains very large stereoscopic disparities compared to display 120c, which uses the constraints enforced by OSCAM library 116. Accordingly, the use of OSCAM library 116 can ensure that stereoscopic visuals remain within the user comfort zone even if scene depth changes occur due to camera or object movement.

Figure 2A:
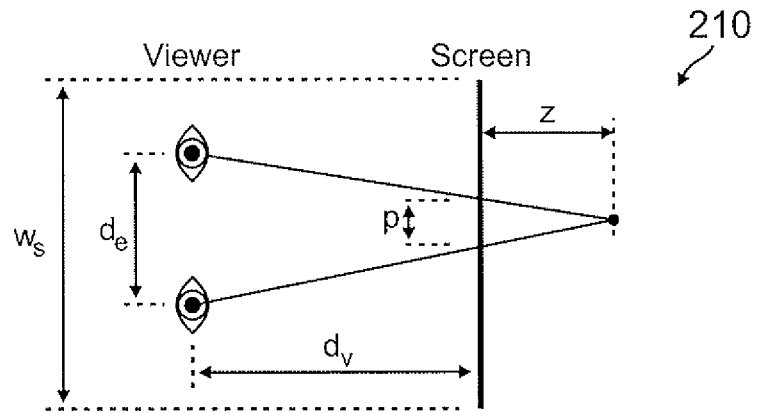
FIGS. 2A, 2B, and 2C present geometric models for deriving constraints of an optimized stereoscopic camera for real-time applications.
Figure 2B:
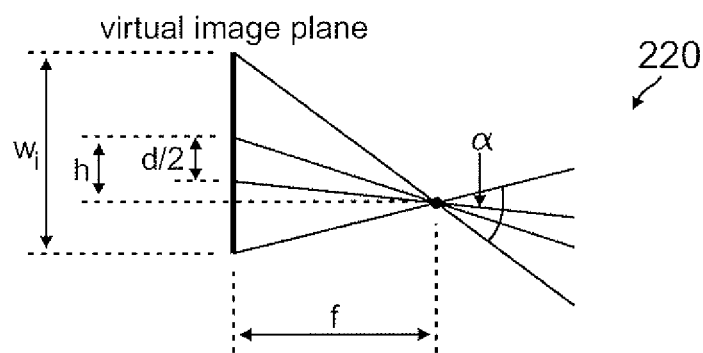
Figure 2C:
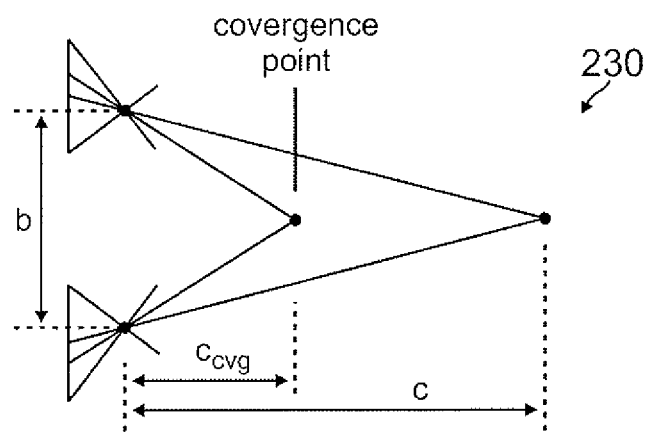

FIGS. 2A, 2B, and 2C present geometric models for deriving constraints of an optimized stereoscopic camera for real-time applications. Diagram 210 of FIG. 2A illustrates a viewer-screen setup. Diagram 220 of FIG. 2B illustrates a single virtual camera. Diagram 230 of FIG. 2B illustrates a dual virtual camera-scene setup.

First, a viewer-centric model of a geometry pipeline will be described, proceeding from FIG. 2A towards FIG. 2C. Observing diagram 210 of FIG. 2A, a viewer, corresponding to user 140 of FIG. 1A, has an interocular separation $d_e$, considered to be on average 65 mm. The viewer is a distance $d_v$ from the screen having a width $w_s$, corresponding to stereoscopic display 120 of FIG. 1A. Since the viewer may be wearing shutter glasses 124 of FIG. 1A or using another method of providing stereoscopic images to each eye, the viewer may perceive a point at depth z due to the viewer's eyes converging according to screen parallax p, or more specifically according to the parameters shown in diagram 230 of FIG. 2C, $p(b, c_{cvg}, c)$, as further described below. This relationship is expressed in the following equation (1):

$$z(b, c_{cvg}, c) = \frac{d_v p(b, c_{cvg}, c)}{d_e - p(b, c_{cvg}, c)}. \quad (1)$$

wherein $z(b, c_{cvg}, c)$ defines a depth behind the screen for positive values and a depth in front of the screen for negative values. Note that this definition of z is an approximation that assumes convergence and binocular disparity as the primary factors for user depth perception.

To transition from FIG. 2A to FIG. 2B, or from real units to virtual units, the ratio of $p(b, c_{cvg}, c):w_s$ is simply scaled to $d(b, c_{cvg}, c):w_i$, wherein $d(b, c_{cvg}, c)$ corresponds to the image disparity, labeled d in diagram 220, and $w_i$ corresponds to the virtual image plane width. Substituting back into equation (1) simplifies into the following equation (2):

$$z(b, c_{cvg}, c) = \frac{w_s}{w_i} \cdot \frac{d_v d(b, c_{cvg}, c)}{\frac{w_i d_e}{w_s} - d(b, c_{cvg}, c)}. \quad (2)$$

Next, transitioning from FIG. 2B to FIG. 2C, the in-scene distance c is incorporated into the equation by using the intercept theorem for a triangle defined by the scene distance c and half the interaxial distance b, as shown in diagram 230 of FIG. 2C, being similar to a triangle defined by camera focus f and h−d/2, wherein h is the image shift, as shown in diagram 220 of FIG. 2B. Similarly, since the triangle defined by f and h is similar to the triangle defined by $c_{cvg}$ and b/2, h can be defined as $f b/(2c_{cvg})$. Combining this definition of h with the intercept theorem as discussed above, equation 2 may be rewritten into equation (3) as follows:

$$z(b, c_{cvg}, c) = \frac{w_s d_v \cdot (c - c_{cvg})}{\frac{w_i d_e}{fb} - w_s \cdot (c - c_{cvg})}. \quad (3)$$

Thus, the perceived depth z is defined as a function of the camera interaxial separation b, the convergence distance $c_{cvg}$, and the scene distance c.

Next, an opposing scene-centric model of the geometry pipeline will be described, proceeding from FIG. 2C towards FIG. 2A. Given the dual camera setup of diagram 230 in FIG. 2C and the camera geometry defined in diagram 220 in FIG. 2B, the in-scene distance c may be expressed as equation (4):

$$c(b, c_{cvg}, z) = \frac{fb}{2h - d(z)} = \frac{fb}{\frac{fb}{c_{cvg}} - d(z)}. \quad (4)$$

Next, incorporating diagram 210 of FIG. 2A, the image disparity d is rescaled to the on-screen parallax p using the image width $w_i$ and the screen width $w_s$, resulting in equation (5):

$$c(b, c_{cvg}, z) = \frac{fb}{\frac{fb}{c_{cvg}} - \frac{w_i p(z)}{w_s}}. \quad (5)$$

Finally, the viewer-screen geometry shown in diagram 210 of FIG. 2A is incorporated by inverting equation (1) into equation (5) to result in equation (6):

$$c(b, c_{cvg}, z) = \frac{fb}{\frac{fb}{c_{cvg}} - \frac{w_i}{w_s} \frac{d_e z}{d_v + z}}. \quad (6)$$

Thus, the in-scene distance c is defined as a function of the camera interaxial separation b, the convergence distance $c_{cvg}$, and the perceived depth z relative to a real world screen or display.

Using the above equations, it is possible to derive constraints for the camera interaxial separation b and the convergence distance $c_{cvg}$ such that a range of perceived depth $[z_1, z_2, z_n]$ with $z_i < z_j$ for $i < j$ is most closely mapped in a least-squares sense to a corresponding range of scene anchor points $[c_1, c_2, \ldots c_n]$ with $c_i < c_j$ for $i < j$.

First, observing equation (2), it can be seen that the transformation from $z(b, c_{cvg}, c)$ to $d(b, c_{cvg}, c)$ is independent of $b$ and $c_{cvg}$. Accordingly, the deriving of the constraints may be simplified by interchanging $z_i$ with the corresponding depth disparity $d_i$. Applying this to equation (4) using the set of scene anchor points $[c_1, c_2, \ldots c_n]$ and simplifying results in the following bilinear system of equations:

$$fbc_1 - fbc_{cvg} - c_1 d_1 c_{cvg} = 0$$
$$fbc_2 - fbc_{cvg} - c_2 d_2 c_{cvg} = 0$$
$$\ldots$$
$$fbc_n - fbc_{cvg} - c_n d_n c_{cvg} = 0.$$

which may then be solved in a least-squares sense using, for example, a Gauss-Newton solver. Accordingly, a particular object or an entire scene defined by scene anchor points $[c_1, c_2, \ldots c_n]$ may be mapped to a desired comfortable perceived depth range bounded by $z_1$ and $z_n$.

To avoid having to solve a potentially large system of equations, the problem may be simplified such that only the minimum and maximum bounding values are considered. This brings the discussion to the important special case of solving the least squares mapping for two perceived depth values $[z_1, z_2]$ corresponding to scene anchor points $[c_1, c_2]$. In this case, the constraints for the interaxial separation $b$ and the convergence distance $c_{cvg}$ may be analytically determined to have the following non-trivial solution:

$$c_{cvg} = \frac{c_1 c_2 (d_1 - d_2)}{c_1 d_1 - c_2 d_2}. \quad (7)$$

$$b = \frac{c_1 c_2 (d_1 - d_2)}{f(c_1 - c_2)}. \quad (8)$$

Thus, a range of anchor points or distances in a scene may be mapped to any arbitrary desired depth volume around the screen or display. Equation (2) may be utilized to derive $d_1$ and $d_2$ for a desired $z_1$ and $z_2$, whereas $c_1$ and $c_2$ of a particular scene may be determined using a min-max algorithm, as discussed below. By enforcing the constraints of equations (7) and (8), a perceived depth range of $[z_1, z_2]$ is guaranteed. This perceived depth range may be set to a comfortable range by the user or to an estimated default comfort range, thereby achieving a comfortable perceived depth range. Additionally, the convergence and interaxial separation may be dynamically and automatically adjusted based on user adjustments to a desired depth volume.

Equations (7) and (8) provide constraints to guarantee comfortable stereoscopy for a single point in time. However, in real-time applications where the user may be in control of the virtual camera, such as in a first person video game, sudden changes to scene depth may occur due to player camera movement or scene object movement. Accordingly, the minimum and maximum anchor points of a scene may suddenly change, resulting in fluctuating scene depths that may appear unnatural to the user. Thus, the next step for improving stereoscopic viewing comfort is to add temporal interpolation to compensate for scene depth changes over time.

Figure 3A:
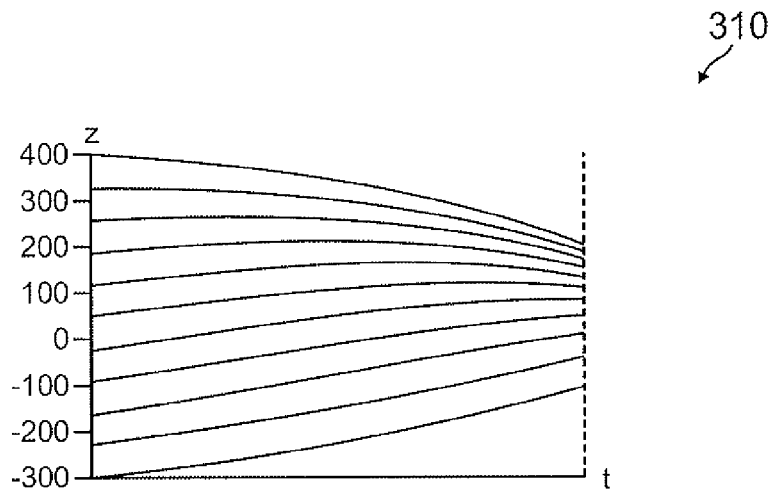
FIGS. 3A, 3B, and 3C present charts demonstrating temporal interpolation of constraints of an optimized stereoscopic camera for real-time applications.
Figure 3B:
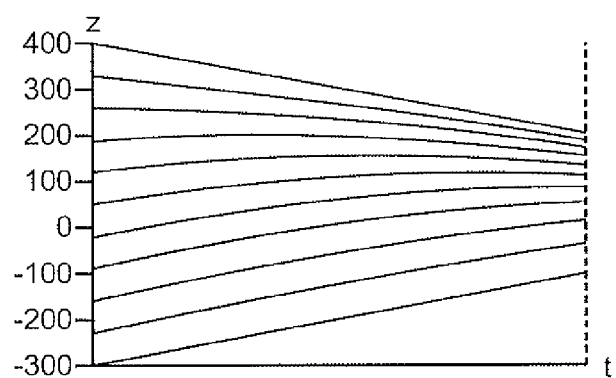
Figure 3C:
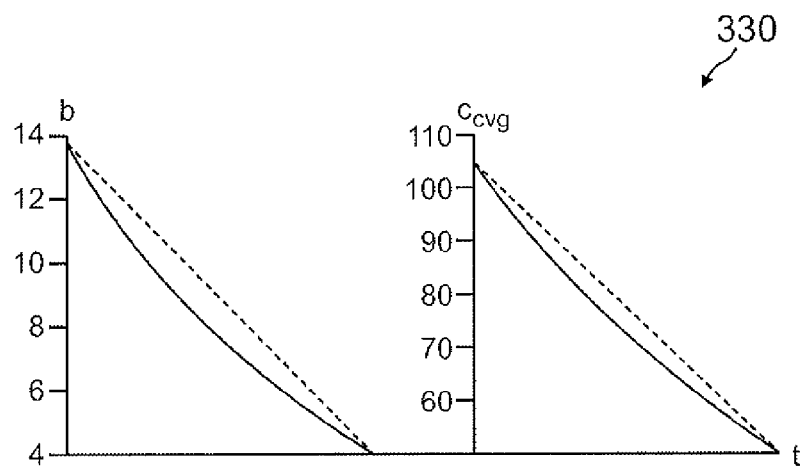

FIGS. 3A, 3B, and 3C present charts demonstrating temporal interpolation of constraints of an optimized stereoscopic camera for real-time applications. Chart 310 of FIG. 3A shows a simple linear interpolation of constraints over time. Chart 320 of FIG. 3B shows an interpolation of constraints over time using a linearized transformation. Chart 330 of FIG. 3C shows the functions utilized for the linearized transformations in chart 320 of FIG. 3B.

As discussed above, scene depth may change over time due to unpredictable camera and object behavior. For example, at time $t$, the minimum and maximum scene depths $c_1$ and $c_2$ may cover an increased range compared to a previous time $t-1$. If the stereo parameters $b$ and are kept constant, the mapped perceived depths $z_1$ and $z_2$ also cover an increased range, possibly leading to excessive disparities. On the other hand, if the constraints on the stereo parameters $b$ and $c_{cvg}$ are immediately recalculated according to equations (7) and (8), the perceived depth of scene objects will suddenly jump, distracting the user and destroying stereopsis. This may be a particular problem if such perceived depth discontinuities repeatedly occur over a period of time. Similar issues may occur with reduced scene depth ranges over time as well.

Once scene depth suddenly changes, it would be desirable to transition the suddenly changed perceived depth range back to the range at the previous time $t-1$ to maintain an approximately constant perceived depth range. One straightforward solution is to simply linearly interpolate the constrained stereo parameters $b$ and $c_{cvg}$ from time $t$ to time $t+1$. Unfortunately, such a simple interpolation function results in a non-linear change to the perceived scene depth and volume of objects, as illustrated by chart 310 of FIG. 3A. Chart 310 of FIG. 3A shows several exemplary scene points being mapped to an expanded perceived depth range between −300 to 400 at time $t$, which may occur due to a sudden camera or object shift. By linearly interpolating the constrained stereo parameters $b$ and $c_{cvg}$ from time $t$ to time $t+1$, the exemplary mapped scene points are translated non-linearly to the new perceived depth range of approximately −100 to 200 at time $t+1$, which may correspond to the prior depth range at time $t-1$. Due to the acceleration of depth changes causing objects to shrink non-linearly in perceived volume, the user may become disoriented.

To improve the results of the interpolation, an arbitrary controlled interpolation function may be defined for preserving an approximately constant perceived depth volume over time. To control the interpolation functions for all points simultaneously, an interpolation variable $\alpha$ is defined in equation (9) as a function that depends on a present time step $\Delta t$ of the interpolation and a defined velocity $v$ that controls the speed of the transformation:

$$\alpha(\Delta t, v) = \min\left( \frac{v \Delta t}{\frac{1}{n} \sum_{i=1}^{n} len(I_i)}, 1 \right) \quad (9)$$

where $\alpha$ is computed as the ratio between the distance for the tune step $\Delta t$ and the average length of all $n$ of the control curves $I_i$. The "min(, 1)" portion is added to avoid overshooting for large $\Delta t$ or $v$. Once in-scene depth changes occur, new perceived depths $z_i^t$ are transitioned using the individual interpolation functions $I_i$ with the global interpolation variable $\alpha$ to return the perceived depths back to $z_i^{t-1}$.

Similar to the derivation of equations (7) and (8), the problem may be simplified such that only the minimum and maximum bounding values are considered, or the special case for interpolating two minimum and maximum perceived depth values $z_1$ and $z_2$. In this case, using the above formulations, the interpolation may be defined in terms of $z_i^t$, allowing the change in perceived depth to be linearized, if desired. However, as previously discussed, any arbitrary curve or discontinuous function may be supported as well. Thus, if $I_i$ is a curve, the curve may be edited to provide specific art-directed depth transition effects. In the case where a linearized transform is desirable, the standard linear interpolation functions may be utilized on the minimum and maximum range boundaries:

$$I_{lin}(z_i^t, z_i^{t-1}, \alpha) = \alpha z_i^t + (1-\alpha) z_i^{t-1}. \quad (10)$$

Graph 320 of FIG. 3B shows the effect of equation (10) on the perceived depth range over time. Comparing graph 320 of FIG. 3B with graph 310 of FIG. 3A, it can be seen that non-linear distortions are significantly reduced. Graph 330 of FIG. 3C shows the resulting functions for the stereo parameters b and $c_{cvg}$. As shown in graph 330, the resulting functions derived from the linearized transformation are not the same as a simple linear interpolation, as indicated by the dashed lines.

Thus, by combining the stereo constraints on dual camera interaxial separation and convergence with a linearized temporal interpolation as described above, a comfortable viewing experience may be provided even in the context of real-time applications where camera and object movement may be user-controlled and unpredictable. This may be demonstrated in a specific scene progression example, as shown in FIGS. 4A and 4B.

Figure 4A:
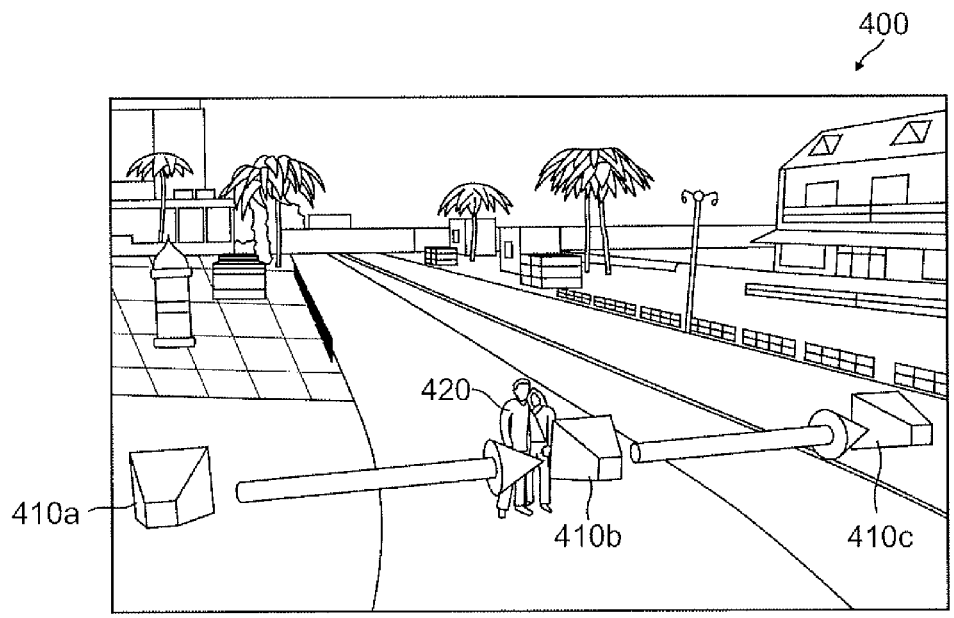
FIG. 4A presents an exemplary progression of a virtual scene.

FIG. 4A presents an exemplary progression of a virtual scene. Within virtual environment 400, a virtual stereoscopic camera may pan from position 410a, to position 410b, and to position 410c. When the camera reaches near position 410b, object 420 may suddenly appear close within the view of the virtual camera, resulting in a significant and discontinuous change in the minimum depth of the scene. As the camera moves towards position 410c, and object 420 is no longer in view of the virtual camera, the minimum depth again suddenly changes, as reflected in the values for $c_1$ shown in FIG. 4B.

Figure 4B:
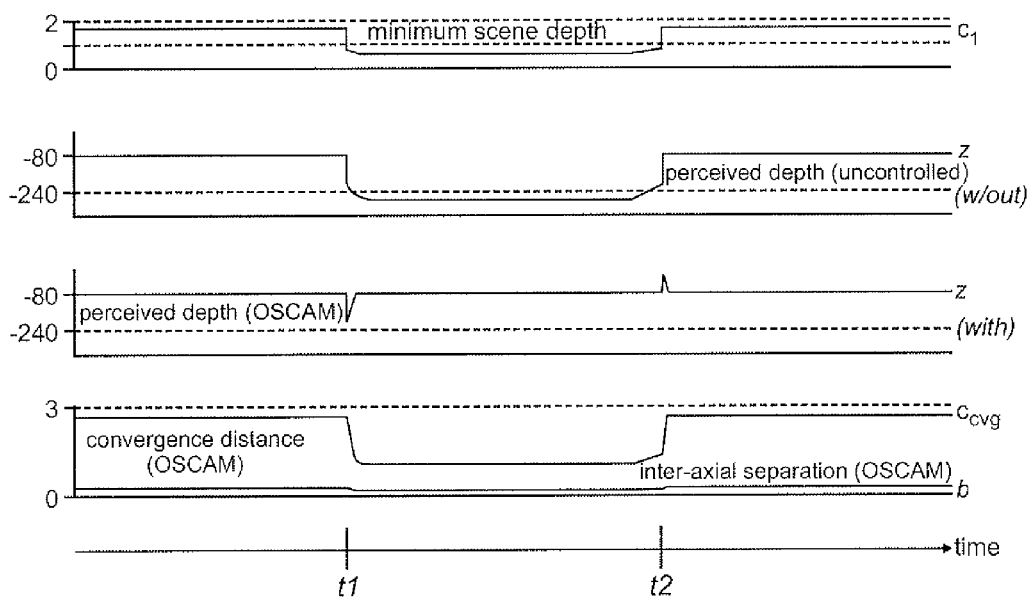
FIG. 4B presents comparisons of an unconstrained and a constrained optimized stereoscopic camera for the virtual scene of FIG. 4A.

FIG. 4B presents comparisons of an unconstrained and a constrained optimized stereoscopic camera for the virtual scene of FIG. 4A. At time $t_1$, the virtual camera in FIG. 4A may begin including object 420 in the camera view, resulting in a sudden change to the minimum scene depth $c_1$, as shown. If the stereoscopic parameters b and $c_{cvg}$ are kept constant, or uncontrolled without constraints, the perceived minimum depth z also suddenly changes at $t_1$. However, if the stereoscopic parameters b and $c_{cvg}$ are constrained with temporal interpolation as described above and shown in FIG. 4B, the perceived minimum depth z changes, but also transitions smoothly and linearly back to its previous value prior to $t_1$. Large disparities over long periods of time are thus advantageously avoided, and perceived depth is kept approximately constant over time. Similarly, when object 420 departs from the camera view at time $t_2$, the perceived minimum depth z changes but smoothly and linearly returns to its previous value.

To implement the stereoscopic constraints with temporal interpolation, the following pseudocode algorithm may be utilized, which is executed for every frame t:

Algorithm 1 Stereo Parameter Update

1: procedure UPDATESTEREOPARAMETER($b^{t-1}$, $c_{cvg}^{t-1}$)
2:     [$c_1^t$, $c_2^t$] ← getSceneDepthRange( )
3:     [$z_0^t$, $z_1^t$] ← mapDepth($c_1^t$, $c_2^t$, $b^{t-1}$, $c_{cvg}^{t-1}$)

Algorithm 1 Stereo Parameter Update

4:     $\alpha$ ← computeAlpha($\Delta t$, v)
5:     [$d_0$, $d_1$] ← transform($I_{lin}$, $z_0^t$, $z_1^t$, $\alpha$)
6:     [$b^t$, $c_{cvg}^t$] ← constrainParameter($c_0^t$, $c_1^t$, $d_0$, $d_1$)
7:     return [$b^t$, $c_{cvg}^t$]
8: end procedure Inputs to the algorithm in line (1) are the stereo parameters from the prior frame, $b^{t-1}$ and $c_{cvg}^{t-1}$ which are updated and returned as stereo parameters for the present frame, $b^t$ and $c_{cvg}^t$. First, the scene depth range is calculated for the present frame in line (2). This may be calculated efficiently using min-max reduction passes of the depth buffer on the GPU, as referenced in Oskam, et al. Using this scene depth range, the new perceived depth range is calculated using the stereo parameters from the prior frame via equation (3) in line (3). Given a target depth range [$z_0^{t0}$, $z_1^{t0}$], which may for example be initially set by the user to a comfortable range, and a preset velocity v, the interpolation variable a may be calculated using equation (9) in line (4). Next, in line (5), the new perceived depth range may be integrated over time using the interpolation function in equation (10) and converted to disparity values using equation (2). Finally, the constraints for the stereo parameters, equations (7) and (8), may be utilized to determine the updated values for the stereo parameters in line (6), which are returned in line (7) as the output and may then be utilized by the stereoscopic renderer of the application to draw the present frame t.

Each of the steps of Algorithm 1 may be calculated in constant time except for line (2), which is logarithmic with the size of the screen. However, by implementing the min-max reduction passes on a highly parallel architecture such as a modern GPU, the depth range may be calculated in under 0.2 ms even for full HD resolutions using modern hardware (tested on an NVIDIA® GTX 580). Thus, even at a high frame-rate such as 60 frames per second where the total frame budget is 16.7 ms, the constrained camera only contributes a minimal processing load and can be readily used even for highly demanding real-time applications.

Figure 5:
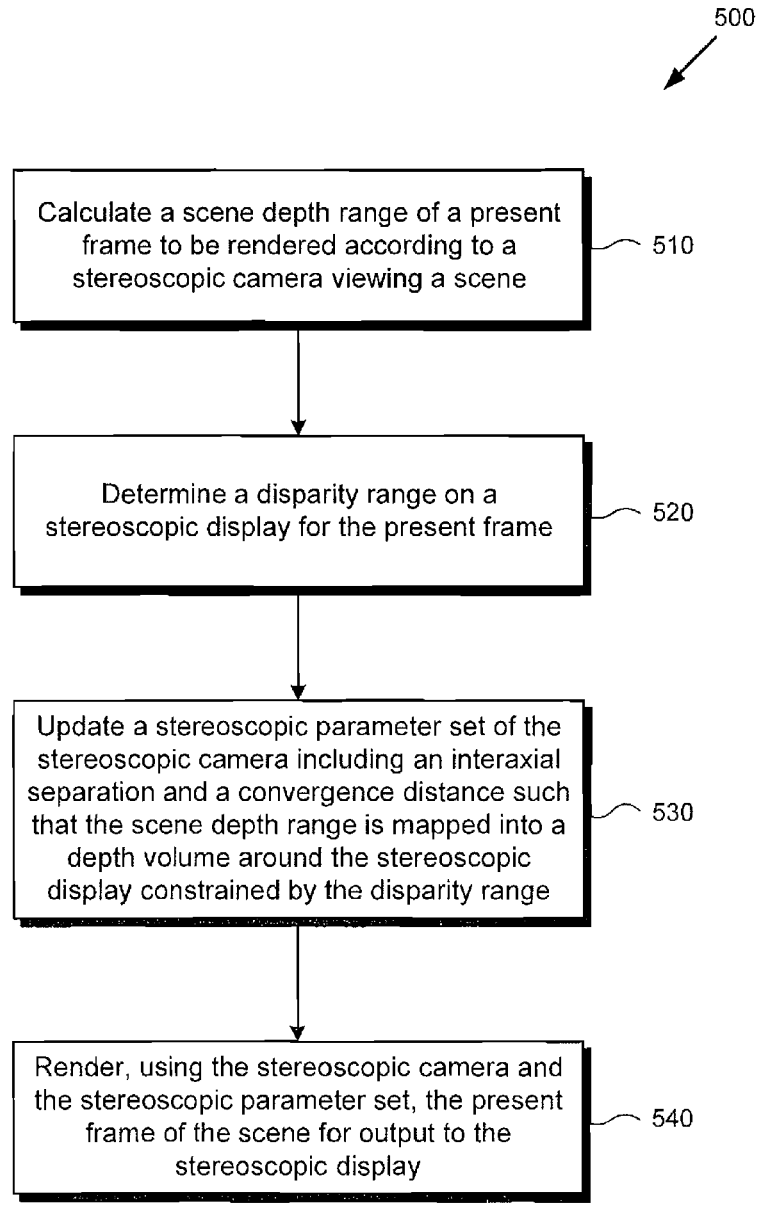
FIG. 5 presents an exemplary flowchart illustrating a method for providing an optimized stereoscopic camera for real-time applications.

FIG. 5 presents an exemplary flowchart illustrating a method for providing an optimized stereoscopic camera for real-time applications. Flowchart 500 begins when GPU 118 calculates a scene depth range [$c_1^t$, $c_2^t$] of a present frame t according to a stereoscopic camera viewing a scene, corresponding to line (2) of Algorithm 1 (510).

Next, a disparity range [$d_0$, $d_1$] on stereoscopic display 120 for the present frame t may be calculated on GPU 118 (520). If temporal interpolation is not utilized, the disparity range may be simply set to a prior frame having a target disparity range derived by equation (2) from the target depth range [$z_0^{t0}$, $z_1^{t0}$], which might be adjusted by user 140 to minimize eye fatigue for viewing comfort. Alternatively, the target disparity range may provide an estimated comfortable viewing range for an average user. However, to avoid sudden jumps in perceived depth of object in the scene, it is preferable to apply a controlled transform towards the prior frame, as discussed above and carried out in lines (3), (4), and (5) of Algorithm 1.

Afterwards, the stereoscopic parameter set ($b^{t-1}$, $c_{cvg}^{t-1}$) of the stereoscopic camera may be updated on GPU 118 such that the scene depth range [$c_1^t$, $c_2^t$] is mapped into a depth volume around stereoscopic display 120 constrained by the disparity range [$d_0$, $d_1$] (530). In other words, the constraints of Equation (7) and (8) are applied to adjust the stereoscopic parameter set, as in line (6) of Algorithm 1.

Once the updated stereoscopic parameter set is returned from Algorithm 1, a renderer of application 115 on GPU 118 can render the present frame using the stereoscopic camera and the stereoscopic parameter set (540). Once the present frame is completed, it may be output to stereoscopic display 120 for viewing by user 140, and flowchart 500 may repeat for the next frame.

While the above example of flowchart 500 focused on adjusting the perceived depth for user comfort, any arbitrary perceived depth range may be mapped to, for example to provide artistic effects. Accordingly, flowchart 500 may also be repeated for a plurality of object subsets including the scene, for example to map specific objects to specific perceived depth areas. This may be useful to provide artist directed depth mapping of objects without requiring the artist to understand the rendering pipeline or the specific camera position and orientation. Moreover, if the target disparity range is determined from a differently sized stereoscopic display than the display used for output, the disparity range may be automatically adjusted if average viewing distances are known for the different sized displays.

Additionally, while system 100 of FIG. 1 shows a setup where the stereoscopic camera is used by a renderer on GPU 118 for a virtual scene, a real life scene may also be captured using a real stereo camera rig. Since only the stereo camera convergence distance and interaxial distance are modified, these properties may be adjusted mechanically while capturing a real life scene to provide a controlled stereo video capture.

Accordingly, an optimized stereo camera may be provided for challenging real-time applications, for example where user 140 may utilize input device 130 to control the movement of the stereoscopic camera, whether virtual or real. Since Algorithm 1 may be wholly implemented on GPU 118 with little overhead, comfortable stereo control and/or interesting artistic effects may be provided even at high framerates and display resolutions. According to a user study, a render using a stereoscopic camera constrained by OSCAM library 116 is preferred 70.9% in terms of comfort and 69.3% in terms of realism compared to a conventional unbounded naïve stereoscopic camera. Thus, the optimized stereo control provided by OSCAM library 116 has the potential to increase user adoption of stereoscopic content by providing improved comfort and realism.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the spirit and the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A method for providing an optimized stereoscopic camera, the method comprising:
    calculating a scene depth range of a present frame to be rendered according to the stereoscopic camera viewing a scene, the stereoscopic camera having a stereoscopic parameter set comprising an interaxial separation and a convergence distance, wherein the stereoscopic parameter set is constrained with temporal interpolation;
    determining a disparity range on a stereoscopic display for the present frame
    updating the stereoscopic parameter set including the interaxial separation and the convergence distance such that the scene depth range is mapped into a depth volume around the stereoscopic display constrained by the disparity range;
    rendering, using the stereoscopic camera and the stereoscopic parameter set, the present frame of the scene for output to the stereoscopic display.

2. The method of claim 1, wherein the determining of the disparity range applies a controlled transform towards a prior frame having a target disparity range.

3. The method of claim 2, wherein the target disparity range is set to minimize eye fatigue for a user of the stereoscopic display.

4. The method of claim 1, wherein prior to the output to the stereoscopic display, the method is applied to a plurality of object subsets comprising the scene.

5. The method of claim 1, wherein the method is executed on a graphics processor unit (GPU).

6. The method of claim 1, wherein the rendering is in real-time.

7. The method of claim 1, wherein the scene is a real life scene.

8. A computing device providing an optimized stereoscopic camera, the computing device including a processor configured to:
    calculate a scene depth range of a present frame to be rendered according to the stereoscopic camera viewing a scene, the stereoscopic camera having a stereoscopic parameter set comprising an interaxial separation and a convergence distance, wherein the stereoscopic parameter set is constrained with temporal interpolation;
    determine a disparity range on a stereoscopic display for the present frame;
    update the stereoscopic parameter set including the interaxial separation and the convergence distance such that the scene depth range is mapped into a depth volume around the stereoscopic display constrained by the disparity range;
    render, using the stereoscopic camera and the stereoscopic parameter set, the present frame of the scene for output to the stereoscopic display.

9. The computing device of claim 8, wherein the processor is configured to determine the disparity range by applying a controlled transform towards a prior frame having a target disparity range.

10. The computing device of claim 9, wherein the target disparity range is set to minimize eye fatigue for a user of the stereoscopic display.

11. The computing device of claim 8, wherein prior to the output to the stereoscopic display, the processor is configured to apply the calculating, the determining, the updating, and the rendering to a plurality of object subsets comprising the scene.

12. The computing device of claim 8, wherein the processor is a graphics processor unit (GPU).

13. The computing device of claim 8, wherein the processor is configured to render in real-time.

14. The computing device of claim 8, wherein the scene is a real life scene.

15. A system for providing an optimized stereoscopic camera, the system comprising:
    a stereoscopic display;
    a computing device having a processor configured to:

calculate a scene depth range of a present frame to be rendered according to the stereoscopic camera viewing a scene, the stereoscopic camera having a stereoscopic parameter set comprising an interaxial separation and a convergence distance, wherein the stereoscopic parameter set is constrained with temporal interpolation;

determine a disparity range on the stereoscopic display for the present frame;

update the stereoscopic parameter set including the interaxial separation and the convergence distance such that the scene depth range is mapped into a depth volume around the stereoscopic display constrained by the disparity range;

render, using the stereoscopic camera and the stereoscopic parameter set, the present frame of the scene for output to the stereoscopic display.

16. The system of claim 15, wherein the processor is configured to determine the disparity range by applying a linearized transform towards a prior frame having a target disparity range.

17. The system of claim 16, wherein the target disparity range is set to minimize eye fatigue for a user of the stereoscopic display.

18. The system of claim 15, wherein the processor is a graphics processor unit (GPU).

19. The system of claim 15, wherein the scene is a real life scene.

20. The system of claim 15, further comprising an input device connected to the computing device for controlling the stereoscopic camera.

* * * * *